C. G. BEWLEY.
FOOD COOLER.
APPLICATION FILED JULY 6, 1918.
1,293,005.
Patented Feb. 4, 1919
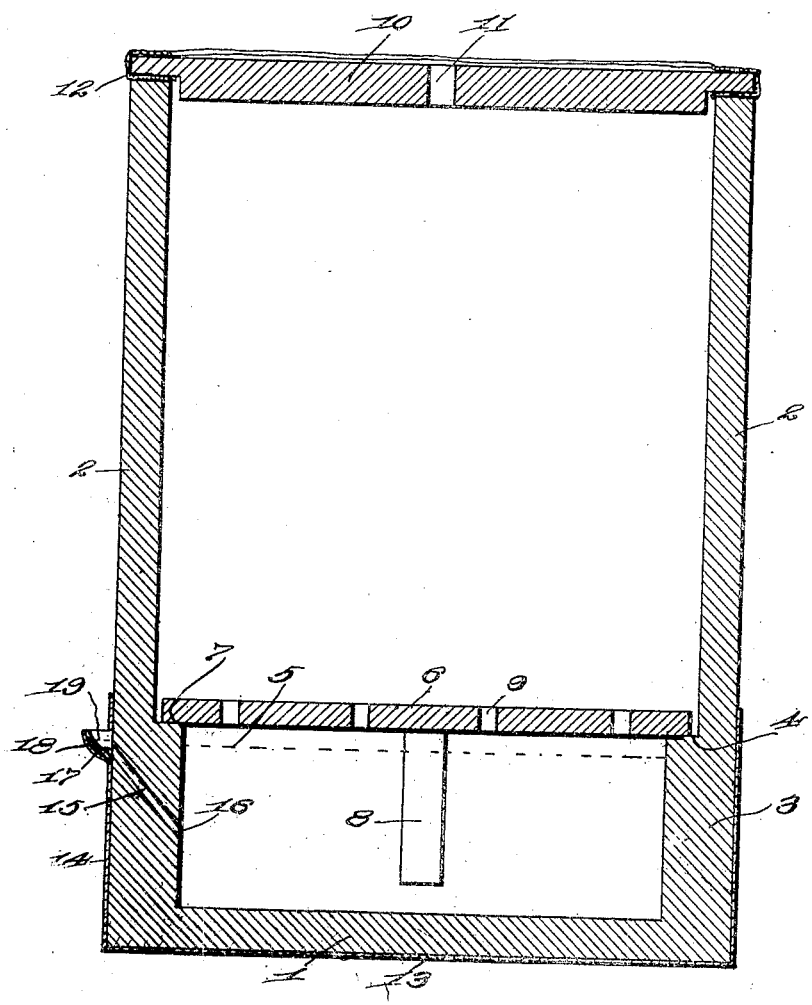
INVENTOR.
Claude G. Bewley
BY
Carl M. Crawford
ATTORNEY

UNITED STATES PATENT OFFICE.

CLAUDE G. BEWLEY, OF SPOKANE, WASHINGTON.

FOOD-COOLER.

1,293,005.

Specification of Letters Patent.

Patented Feb. 4, 1919.

Application filed July 6, 1918. Serial No. 243,691.

*To all whom it may concern:*

Be it known that I, CLAUDE G. BEWLEY, a citizen of the United States, residing at Spokane, in the county of Spokane and State of Washington, have invented new and useful Improvements in Food-Coolers, of which the following is a specification.

This invention relates to improvements in food or like coolers in which reliance is placed upon capillary attraction to moisten the walls of the cooler so as to lower the temperature by the resulting evaporation.

More specifically, my invention consists of a receptacle formed of concrete or like porous material and adapted to receive a quantity of water in the lower portion thereof.

A further feature consists in providing a porous article support which is maintained above the water level and which is provided with a porous projection depending into the water so as to maintain the article support constantly moist as long as the supply of water is intact.

Other features of the invention will be more fully described in connection with the accompanying drawing, and will be more particularly pointed out in and by the appended claims.

In the drawing, I have shown a vertical sectional view of a cooler embodying my invention.

As illustrated, 1 designates the bottom wall of the receptacle which is formed integral with an upright wall 2. The receptacle may be formed of any porous material such as would initiate and sustain capillary attraction but I prefer to make the receptacle wholly of concrete, and extremely porous throughout the entire cross-section of the bottom and the upright walls 1 and 2. The importance of this feature will readily be appreciated because of the fact that I can not only make the entire structure of a single mixture of porous material, thereby saving time in preparation of material, but I can also mold the receptacle from a single mixture, thereby saving additional time.

I preferably thicken the portion 3, of the upright wall 2, to form a ledge or shoulder 4 which is conveniently located slightly above the maximum water level 5. On said shoulder or support is mounted an article support 6 which is preferably of porous material and which I intend to make of concrete. It will be understood that very porous coarse concrete, unless the abutting edges are smoothed, will not sustain the action of capillary attraction across a juncture such as the point of contact 7 between the article support 6 and the shoulder 4. Therefore, it is a feature of my invention to provide the porous article support 6 with a projection 8, likewise of porous material, and of sufficient length to extend downwardly into the water and thereby initiate capillary attraction to maintain the article support in a moist damp condition. Suitable air-holes 9, may be provided in said support 6. Therefore, anything resting upon the support 6 which would require or be benefited by a sustained supply of moisture could be maintained in a healthy and beneficial condition.

A suitable lid 10 covers the top of the receptacle and may be provided with an air vent 11. In order to maintain the lid 10 in a moist condition, I interpose a gasket of soft fabric, as indicated at 12, to permit the moisture carried by the upright wall 2 to pass into and saturate the lid 10. This avoids the operation of smoothing off the top wall 2 or the bottom portion of the lid 10 that would otherwise meet the upper margin of the upright wall 2.

Now it will be readily seen that if the bottom wall 1 and the upright wall 2 are extremely porous, a greater portion of the moisture initiated by capillary attraction would pass downwardly through the bottom wall 1 and outwardly and downwardly through the lower portion of the upright wall 2 onto the table or floor on which the container was supported. This would be objectionable in itself, besides the abnormal resulting waste of water which would require frequent filling. Therefore, it is a feature of my invention to apply some kind of water-proofing to the bottom wall 1, preferably the exterior thereof as indicated at 13, and to the periphery of the upright wall 2, as indicated at 14. This water-proofing may be of any of the non-metallic or metallic types that may be applied with a brush and of a character in which the water-proofing will merge into the texture of the receptacle itself. I have found in practice that I can paint the exterior with cement and thereby render the receptacle leak-proof throughout the area protected.

By water-proofing the bottom of wall 1, and by providing the thickened lower portion 3, of the upright wall 2, I thereby initiate a very effective capillary attractive charge of the moisture upwardly through the wall 2.

In order to indicate to the user the height of water in the receptacle, I provide a filling bore 15 having its discharge end 16 located considerably below the water level 5. The intake end 17 terminates in a cup 18 which may be molded onto the exterior of wall 2 and through which water may be poured to fill the receptacle up to the desired level, the dotted line 19 indicating such level. When the water in the cup 18 descends so that it can not be observed, then the user knows that the water has been utilized so that it is below the maximum level.

It will now be clear that I have provided a cooler which is very effective in action and which can be manufactured so cheaply as to be within the reach of a very large class of people who are unable to provide themselves with ice.

It is believed the advantages and utility of my invention will be clearly understood by the foregoing description, and while I have herein shown and described the same in connection with the specific form shown, I do not wish to be limited thereto except for such limitations as the claims may import.

I claim:

1. In a food or like cooler, a one piece receptacle of concrete or like porous material having a water chamber in its bottom whereby the water in the bottom will be drawn upwardly through the walls to cool the interior of said receptacle, characterized by the bottom wall being water-proofed and the upright wall being water-proofed up to a point approximately to the level of the water to be contained in said receptacle whereby the remainder of the cross-section of the upright wall will be free to draw the water upwardly therein and promote evaporation interiorly of said cooler, substantially as described.

2. In a food or like cooler, a receptacle formed of a porous material and adapted to contain a quantity of water in the bottom thereof for capillary movement of the water upwardly through the walls thereof to cool the interior, a porous food support in said receptacle above the water level therein, and said support having a porous portion projecting downwardly into the water to render said porous support damp, substantially as described.

3. In a device of the character described, a receptacle for containing a body of water, a porous supporting member disposed above the water level and having a projection of porous material extending therefrom into the water to maintain said porous support damp and moist, substantially as described.

In testimony, that I claim the foregoing as my own, I hereby affix my signature.

CLAUDE G. BEWLEY.